(12) United States Patent
Nejatian et al.

(10) Patent No.: US 9,853,800 B2
(45) Date of Patent: Dec. 26, 2017

(54) METHOD AND RADIO NODE FOR CONTROLLING CHANGE OF COMMUNICATION MODE

(75) Inventors: Alireza Nejatian, Uppsala (SE); Youp Su, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 365 days.

(21) Appl. No.: 14/366,313

(22) PCT Filed: Dec. 21, 2011

(86) PCT No.: PCT/SE2011/051564
§ 371 (c)(1),
(2), (4) Date: Jun. 18, 2014

(87) PCT Pub. No.: WO2013/095229
PCT Pub. Date: Jun. 27, 2013

(65) Prior Publication Data
US 2014/0355495 A1    Dec. 4, 2014

(51) Int. Cl.
*H04L 5/14* (2006.01)
*H04B 1/04* (2006.01)
(Continued)

(52) U.S. Cl.
CPC ............. *H04L 5/14* (2013.01); *H04B 1/0483* (2013.01); *H04B 1/44* (2013.01); *H04L 43/065* (2013.01); *H04W 24/02* (2013.01)

(58) Field of Classification Search
CPC ...................................................... H04L 15/14
(Continued)

(56) References Cited

U.S. PATENT DOCUMENTS 6,137,734 A * 10/2000 Schoner ............... G11C 29/028
                                                                        365/194
6,658,030 B1 * 12/2003 Baumgartner ....... H04B 10/032
                                                                        372/29.02
(Continued)

FOREIGN PATENT DOCUMENTS

EP    2 226 955        9/1920
EP    1 355 509       10/2003
(Continued)

OTHER PUBLICATIONS

PCT Written Opinion of the International Searching Authority for International Application No. PCT/SE2011/051564, Sep. 12, 2012.
(Continued)

*Primary Examiner* — Melvin Marcelo
*Assistant Examiner* — Peter Solinsky
(74) *Attorney, Agent, or Firm* — Patents on Demand, P.A.; Brian K. Buchheit; Scott M. Garrett

(57) ABSTRACT

Method and radio node (500) for controlling a change of communication mode between transmit mode and receive mode according to a Time Division Duplex, TDD, scheme. The radio node has at least two parallel branches (504, 06) for transmission and reception of radio signals, wherein the branches currently operate in a first communication mode. The radio node obtains one or more indication signals (S1A, S1B) generated by one or more of the branches to indicate that the first mode has been turned off. When it is determined that the first communication mode has not been turned off in a faulty branch, e.g. by not receiving an indication signal in time from that branch, the first mode is disabled in the faulty branch, and/or the faulty branch is reported to a supervision center (510). Thereby, it can be discovered when one of the branches is misaligned or otherwise faulty and suitable (Continued)

actions can be taken for repairing or replacing the faulty branch.

18 Claims, 5 Drawing Sheets

(51) Int. Cl.
*H04B 1/44* (2006.01)
*H04L 12/26* (2006.01)
*H04W 24/02* (2009.01)

(58) Field of Classification Search
USPC .......................................... 370/280
See application file for complete search history.

(56) References Cited

U.S. PATENT DOCUMENTS

| | | |
|---|---|---|
| 2009/0080325 A1 | 3/2009 | Parnaby |
| 2009/0318089 A1 | 12/2009 | Stratford et al. |
| 2010/0251050 A1* | 9/2010 | Takeuchi ............. H04B 7/0615 714/746 |
| 2011/0044188 A1 | 2/2011 | Luo et al. |
| 2012/0269161 A1* | 10/2012 | Chin ..................... H04B 7/2618 370/330 |
| 2014/0314129 A1* | 10/2014 | Roper ..................... H01Q 7/00 375/218 |

FOREIGN PATENT DOCUMENTS

| | | |
|---|---|---|
| EP | 1 469 616 | 10/2004 |
| EP | 1 983 659 | 10/2008 |
| WO | WO 00/40050 | 7/2000 |
| WO | WO 2010/123229 | 10/2010 |

OTHER PUBLICATIONS

International Search Report for International Application No. PCT/SE2011/051564, Sep. 12, 2012.
PCT International Search Report for International Application No. PCT/SE2011/051090, Jul. 2, 2012.

* cited by examiner

METHOD AND RADIO NODE FOR CONTROLLING CHANGE OF COMMUNICATION MODE

PRIORITY

This nonprovisional application is a U.S. National Stage Filing under 35 USC. §371 of International Patent Application Serial No. PCT/SE2011/051564, filed Dec. 21, 2011 and entitled "Method and Radio Node for Controlling Change of Communication Mode."

TECHNICAL FIELD

The present disclosure relates generally to a method and a radio node for controlling a change of communication mode between transmit and receive modes, when using Time Division Duplex (TDD) and multiple output branches for communication of radio signals in a cellular network.

BACKGROUND

A technology known as "Long-Term Evolution, LTE" has been developed for radio communication in cellular networks. In LTE, different schemes of communication can be used for radio nodes in a cellular network such as Frequency Division Duplex (FDD), TDD and half duplex. In this description, the term "radio node" represents any of a base station belonging to a cellular network and a user equipment operated by a user.

In TDD, a single physical channel can be utilized for both uplink and downlink transmissions which must be separated in time, in a communication between a base station and a user equipment. Therefore, the participating radio nodes are required to change between transmit mode and receive mode according to a predefined radio frame scheme, thus avoiding that uplink and downlink transmissions occur on that physical channel simultaneously. An example of such a scheme is illustrated in FIG. 1. In this example, a radio frame 100 of 10 ms duration is divided into ten sub-frames 0-9 of 1 ms duration each, which can be used for either uplink or downlink transmissions on the same physical channel in a communication. In the Third Generation Partnership Project (3GPP), a number of different uplink-downlink configurations have been defined for sub-frames 0-9 in a radio frame. In FIG. 1, some exemplary arrows are shown within the sub-frames to indicate whether a sub-frame is scheduled for uplink or downlink.

Some of the sub-frames can typically be scheduled for either uplink or downlink such as sub-frames 3, 4 and 6. In this exemplifying figure, an uplink transmission in sub-frame 4 is followed by a downlink transmission in sub-frame 5, implying that the base station must switch from receive mode in sub-frame 4 to transmit mode in sub-frame 5. The user equipment must correspondingly switch from transmit mode in sub-frame 4 to receive mode in sub-frame 5. A single sub-frame 1 may even be divided into a field 102 for a downlink Pilot Time Slot, DwPTS, and a field 104 for an uplink Pilot Time Slot, UpPTS, the fields 102 and 104 being separated by a field 106 denoted Guard Period, GP allowing for the above switch and transition of communication modes. This example thus illustrates that both nodes must change between transmit mode and receive mode in a very accurate and synchronized manner to avoid collisions and disturbances on the physical channel used, particularly between uplink and downlink transmissions.

Different radio nodes, including both base stations and user equipments, transmitting in a cellular network are typically required to be mutually synchronized by locking to a common precise reference, such as a pulse emitted from a Global Positioning System (GPS), in order to use a TDD radio frame scheme without collisions. It is also common that multiple parallel transmit branches and antennas are employed in a radio node, e.g. to achieve benefits such as diversity, improved data bit rate and/or enhanced signal reception quality, where the same signals are transmitted or received in parallel over two or more branches and antennas. Some well-known examples of technologies employing parallel branches and antennas are transmit (TX) diversity, Multiple-Input Multiple-Output (MIMO), Beam Forming (BF) and spatial multiplexing. In order to achieve improved performance by using such multiple branches, it is required that the signals emitted from the different antennas are aligned in time, typically also in phase and amplitude.

A simplified example of using multiple branches and antennas in a radio node is schematically illustrated in FIG. 2. The shown radio node 200 may be a base station or a user equipment. Any commonly used amplifiers and filters are omitted in this figure for clarity.

The radio node 200 comprises a digital radio part 202 and two branches 204 and 206, denoted A and B, which are used for both transmission and reception of signals through respective antennas 204c and 206c depending on the mode of communication which can be changed as said above. In the digital radio part 202, a signal generator 202a generates signals which are injected to and transmitted over both branches A and B simultaneously. The signal generator 202a conventionally includes a digital-to-analogue converter, a modulator and an amplifier, which are not shown in this figure for simplicity. The generated signals are first fed to transmit delay buffers 202b and 202c in the radio part 202, which can be pre-configured to delay the signal in time individually in order to calibrate the radio node for output on the two branches and simultaneous emission from the respective antennas 204c, 206c.

The signals issued from digital radio part 202 are injected to respective transmit (TX) chains 204a and 206a in the branches A and B, respectively, and the branches A and B correspondingly comprise receive (RX) chains 204b and 206b for reception of signals through each of the branches. Each chain can be turned on and off, which is used for changing communication mode in each branch. As indicated in the figure, when the TX chains are on the RX chains are off as indicated by full arrows, and correspondingly when the RX chains are on the TX chains are off as indicated by dashed arrows, in accordance with the prevailing radio frame scheme of sub-frames. The functionality for changing between TX and RX mode in the branches is well known and not necessary to describe in more detail here.

When using such multiple transmit branches and antennas, it is important that the signals are emitted at the same time from the antennas 204c and 206c in transmit mode, otherwise reception of signals on one antenna may be disturbed by transmission of signals from the other antenna, which will be explained in more detail below with reference to FIG. 3 and FIG. 4. Simultaneous emission is also needed to achieve the intended benefit of using parallel branches and antennas. Even though only two antennas are shown in FIG. 2, the above-described arrangement is also applicable for any number of transmit branches and antennas which need to be synchronized in time to avoid misalignment errors.

FIG. 3 depicts a curve 300 showing how output power for transmission from an antenna of a radio node, such as antennas 204c and 206c in the above example, changes over time when switching between receive and transmit modes. First, the output power is at an OFF level when in the RX mode. Then at a time t1, transmission is turned on to change into the TX mode and the output power rises up to an ON level which is reached at a time t2. The period from t1 to t2 is thus a transit period from RX mode to TX mode. Correspondingly, at a time t3, the transmission is turned off to change back again into RX mode and the output power decreases down to the OFF level which is reached at a time t4. The period from t3 to t4 is thus a transit period from TX mode to RX mode.

The transit periods t1-t2 and t3-t4 are needed to ramp up and down, respectively, the output power in the radio node according to the shown curve, which can be done during guard periods between uplink and downlink transmissions in the radio frame when no transmission is allowed from either side, such as in the guard period 106 shown in FIG. 1 or between sub-frames 4 and 5. However, if there is a misalignment in the timing of TX and/or RX modes between two or more parallel branches in a radio node, the reception of signals in one branch may be disturbed, or interfered, by a transmission from another branch, thus causing disturbances in the communication. Such a misalignment between transmit branches may also cause severe equipment damages when one branch is still in receive mode and its antenna receives a very strong signal from a closely located antenna of another branch, e.g. of the same radio node or another close radio node, having just changed to transmit mode, or ramping up to transmit mode. The received signal strength in that case may exceed by many times a normal signal strength of signals received from an opposite radio node in normal communication between a base station and a user equipment.

This is schematically illustrated by an example in FIG. 4 where a radio node comprises two radio units, each being similar to the radio node 200 in FIG. 2, having two branches in each radio unit. In this example, transmission from one branch 1B of a first radio unit is delayed in relation to transmission from another branch 1A of the first radio unit, and also in relation to transmission from two branches 2A and 2B of a second radio unit arranged to transmit the same signals, thus causing a misalignment error of Δt between transmission from branch 1B and transmission from the other branches 1A, 2A and 2B. This misalignment error results in interference from branches 1A, 2A and 2B, while ramping up to the transmit mode during period t1-t2, to branch 1B being still in receive mode during period t1-t2, as indicated by a dashed arrow on the left side in FIG. 4. Correspondingly, branch 1B ramps down from the transmit mode after t4 causing interference to branches 1A, 2A and 2B having already entered receive mode at t4, as indicated by another dashed arrow on the right side in FIG. 4.

It is currently a requirement in 3GPP that the misalignment error between two parallel transmit branches should not exceed a preset limit of 65 nanoseconds to avoid communication disturbances or equipment damages. Therefore, radio nodes are carefully calibrated, e.g. by means of transmit delay buffers coupled to the transmit branches, to fulfill the above requirement. It may still happen that a branch can alter its signal propagation time and/or mode switching, e.g. due to damage or ageing of components, or malfunction of software, such that the resulting misalignment error exceeds the preset limit which may typically go unnoticed, still resulting in a degradation of performance in the radio node. This performance degradation may cause decreased accuracy in signal detection, decreased data throughput, increased interference, radio coverage reduction, severe equipment damages, and so forth.

SUMMARY

It is an object of the invention to address at least some of the problems and issues outlined above. It is possible to achieve these objects and others by using a method and a radio node as defined in the attached independent claims.

According to one aspect, a method is provided for controlling a change of communication mode between transmit mode and receive mode in a radio node according to a Time Division Duplex, TDD, scheme. The radio node has at least two parallel branches and antennas for transmission and reception of radio signals through each of the at least two parallel branches, wherein the branches currently operate in a first communication mode of the transmit mode and receive mode.

In this method, the radio node obtains one or more indication signals generated by one or more of the at least two parallel branches to indicate that the first communication mode has been turned off. The radio node then determines whether the first communication mode has been turned off in all of the at least two parallel branches based on the obtained one or more indication signals, and instructs the at least two parallel branches to operate in a second communication mode. When it is determined that the first communication mode has not been turned off in a faulty branch of the at least two parallel branches, the radio node performs at least one of: disabling the first communication mode in the faulty branch, and reporting the faulty branch to a supervision centre.

According to another aspect, a radio node is configured to control a change of communication mode between transmit mode and receive mode according to a Time Division Duplex scheme. The radio node may be a base station of a cellular network, or a user equipment. The radio node comprises at least two parallel branches and antennas for transmission and reception of radio signals through each respective one of the at least two parallel branches, wherein the branches are operable in first and second communication modes of the transmit mode and receive mode.

The radio node also comprises a control unit which in turn comprises an obtaining unit adapted to obtain one or more indication signals generated by one or more of the parallel branches to indicate that the first communication mode has been turned off. The control unit also comprises a logic unit adapted to determine whether the first communication mode has been turned off in all of the at least two parallel branches based on the obtained one or more indication signals, and an instructing unit adapted to instruct the parallel branches to operate in the second communication mode.

In the case when it is determined that the first communication mode has not been turned off in a faulty branch of the parallel branches, the logic unit is further adapted to perform at least one of: disable the first communication mode in the faulty branch, and report the faulty branch to a supervision centre.

The above method and apparatus may be configured and implemented according to different optional embodiments. In one possible embodiment, the radio node performs the above determination when a time-out is reached for the first communication mode. When a faulty branch is discovered, a transmission delay of the faulty branch may be adjusted, to reduce or eliminate the fault such that first communication mode will be turned off in time in this branch. Adjusting the transmission delay may comprise altering a transmit delay buffer coupled to the faulty branch.

In further possible embodiments, in the case when the first communication mode is transmit mode and the second communication mode is receive mode, the indication signal may be triggered in a respective branch of the at least two parallel branches by any of:

a transmit chain in the respective branch has no input signal, the transmit chain in the respective branch is shut off, a transmit power amplifier in the respective branch is shut off, and signals leaving the transmit chain in the respective branch have a strength not exceeding a maximum acceptable level.

Further, in the case when the first communication mode is receive mode and the second communication mode is transmit mode, the indication signal may be triggered in a respective branch of the parallel branches when a receive chain in the respective branch is shut off.

In further possible embodiments, the method may be performed at intervals according to a scheme, to check whether the at least two parallel branches are aligned or misaligned in time. Alternatively or additionally, the method may be performed in order to identify any faulty branch when detecting disturbances, damage or interference, either caused by the radio node.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable improved performance in a TDD radio node by avoiding the above-described collisions between multiple parallel branches and antennas for transmission and reception of radio signals. In this solution, a functional entity denoted "control unit" is introduced for controlling the change of communication modes based on signals generated by the branches to indicate when the branches have turned off a first communication mode, such that a second communication mode can be turned on. If a faulty branch has not provided such a signal, the control unit can disable the first communication mode in the faulty branch and/or report the faulty branch to a supervision function which may be implemented in a radio unit or in an Operation and Maintenance (O&M) node or the like in the network. In this description, the terms "first communication mode" and "second communication mode" should be understood as either TX and RX modes or RX and TX modes, respectively. The solution can thus work in both directions, as will be explained below.

Figure 5A:
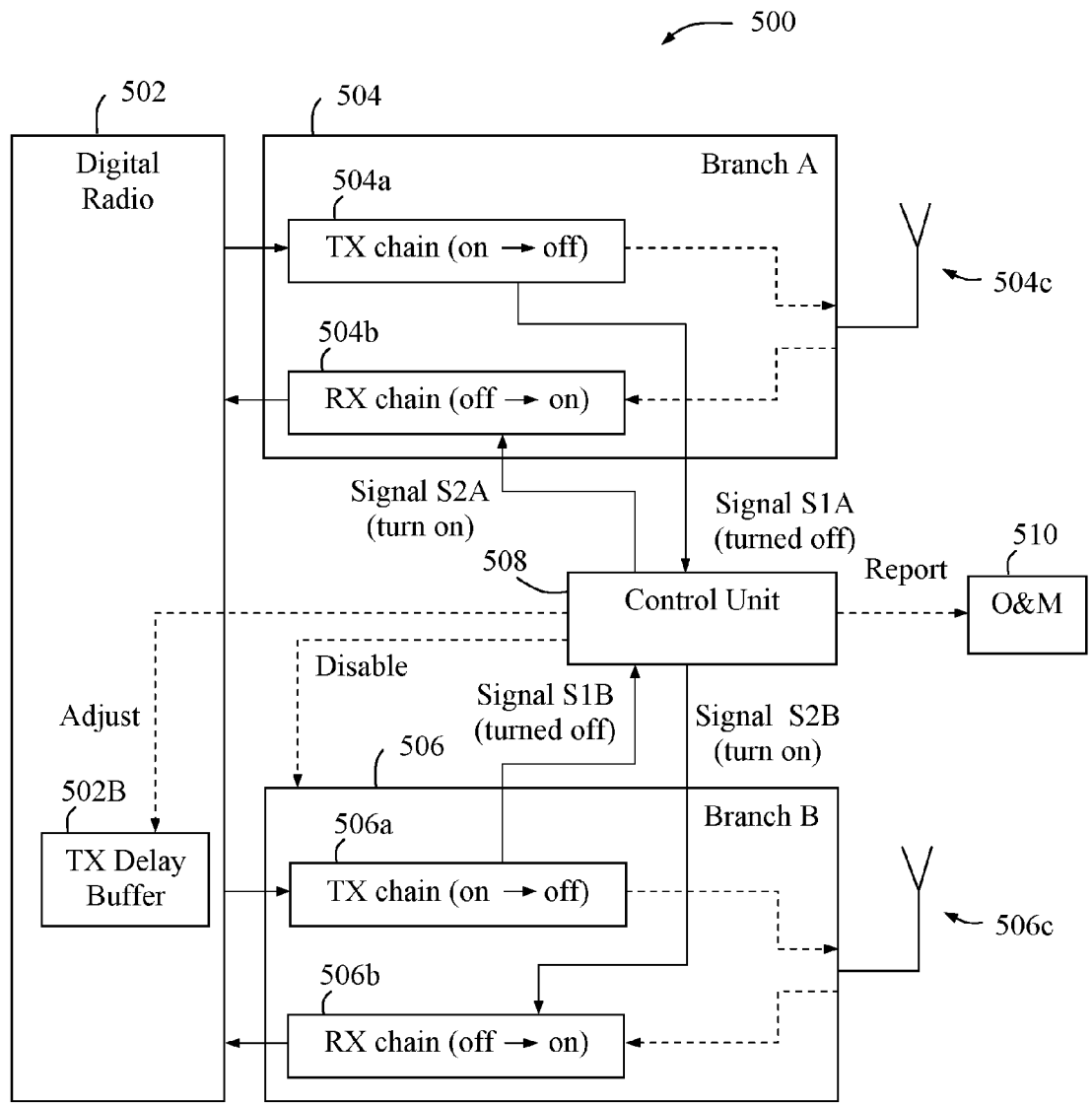
FIGS. 5a and 5b are block diagrams illustrating two examples of how the solution can work in a radio node, according to further possible embodiments.
Figure 5B:
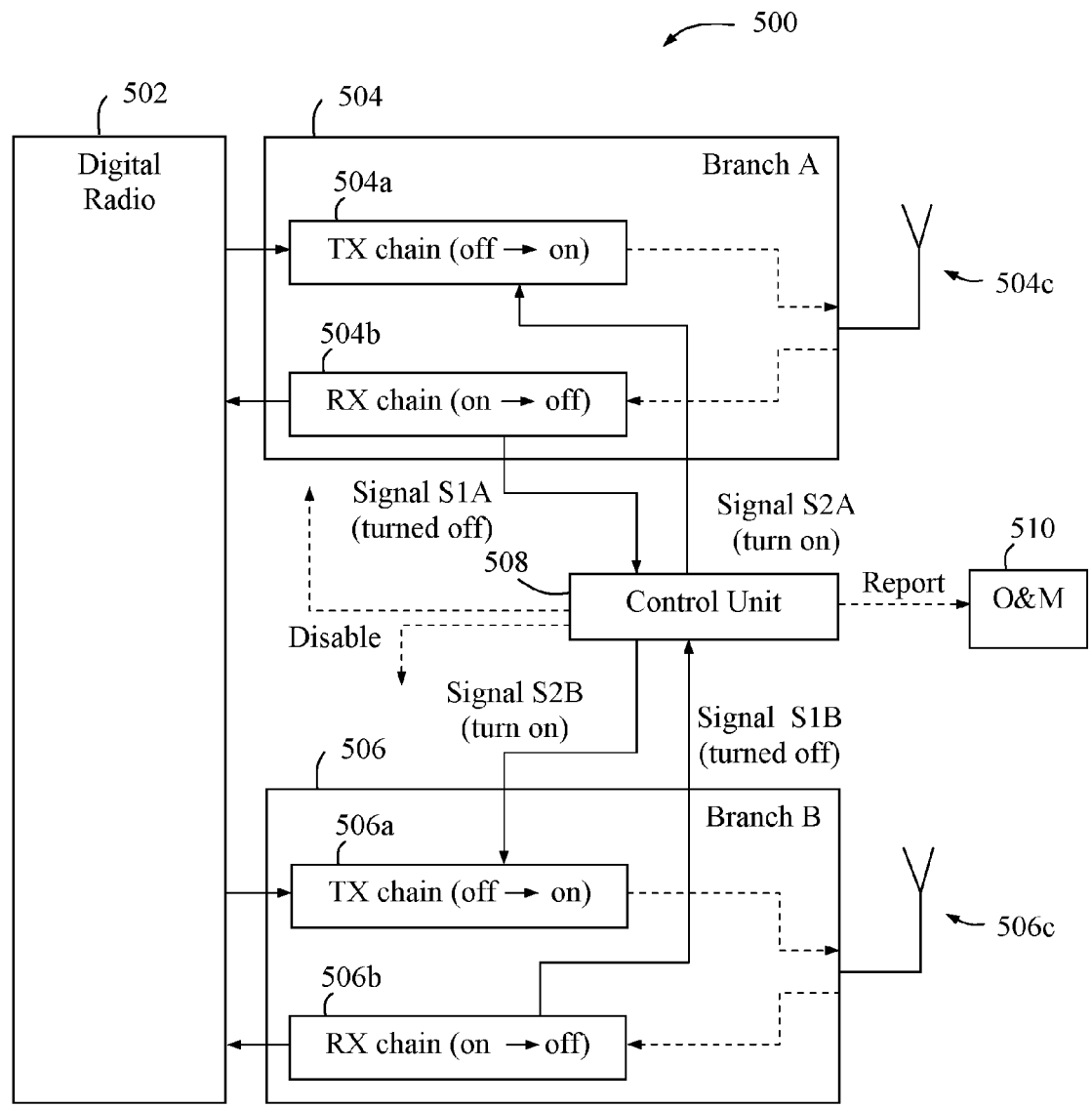

Two examples of how this solution can be put into practice for controlling a change of communication mode between transmit mode and receive mode in a TDD radio node, will now be described with reference to FIGS. 5a and 5b. In FIG. 5a, an example is shown where the radio node 500 changes communication mode from TX mode to RX mode, while FIG. 5b shows an example where the radio node 500 changes communication mode from RX mode to TX mode. In these examples, the radio node 500 may either be a base station of a cellular network, or a user equipment.

Figure 1:
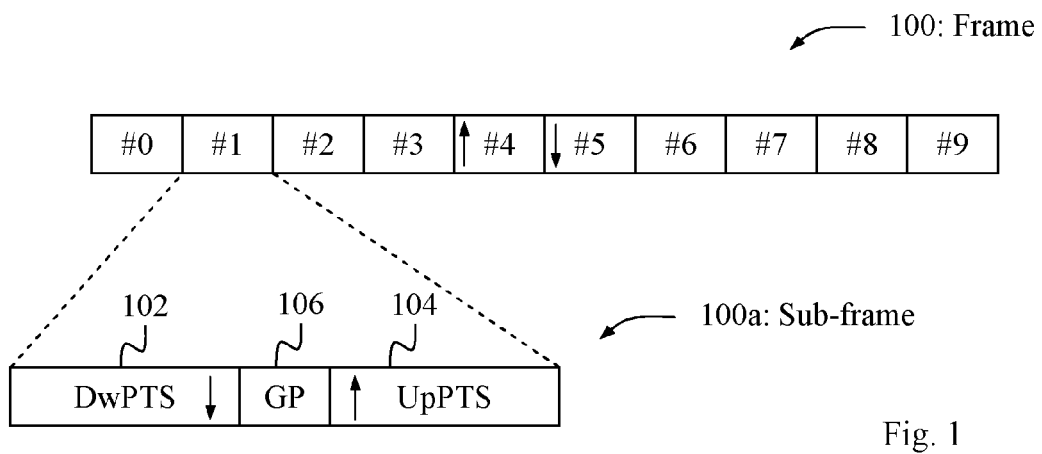
FIG. 1 is a diagram illustrating a typical TDD radio frame scheme, according to the prior art.
Figure 2:
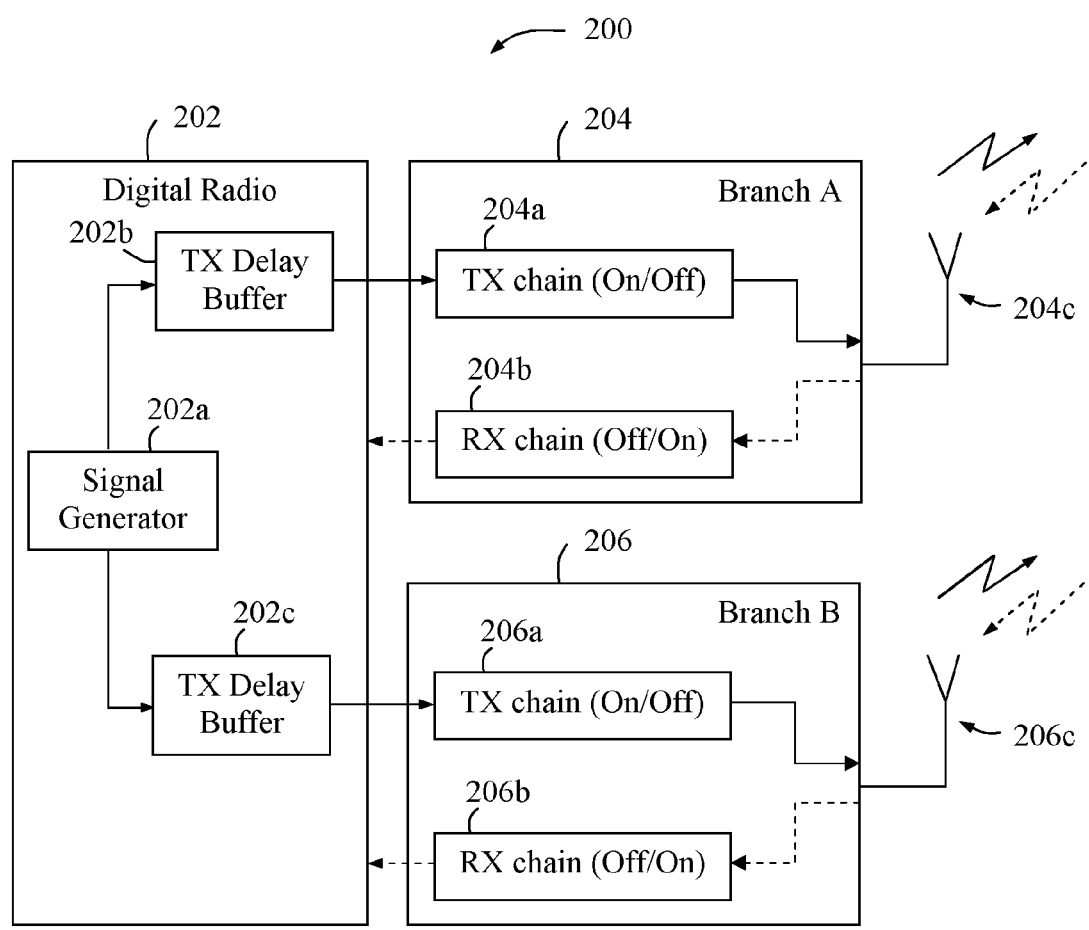
FIG. 2 is a block diagram illustrating a typical radio node with parallel branches and antennas, according to the prior art.

In these examples, the radio node 500 is similar to the radio node 200 of FIG. 2, by having a digital radio part 502 and two parallel branches 504 and 506, denoted A and B, which are used for both transmission and reception of signals through respective antennas 504c and 506c. It should be noted that although the following examples are described for just two branches, the solution can be applied for any number of multiple parallel branches. As in FIG. 2, the digital radio part 502 also comprises a signal generator and transmit delay buffers, all of which are not shown here for simplicity. Further, the branches A and B comprise TX chains 504a and 506a and RX chains 504b and 506b, respectively, where each chain can be turned on and off to switch communication mode in accordance with the prevailing radio frame scheme, i.e. in the manner described for FIG. 2.

Figure 3:
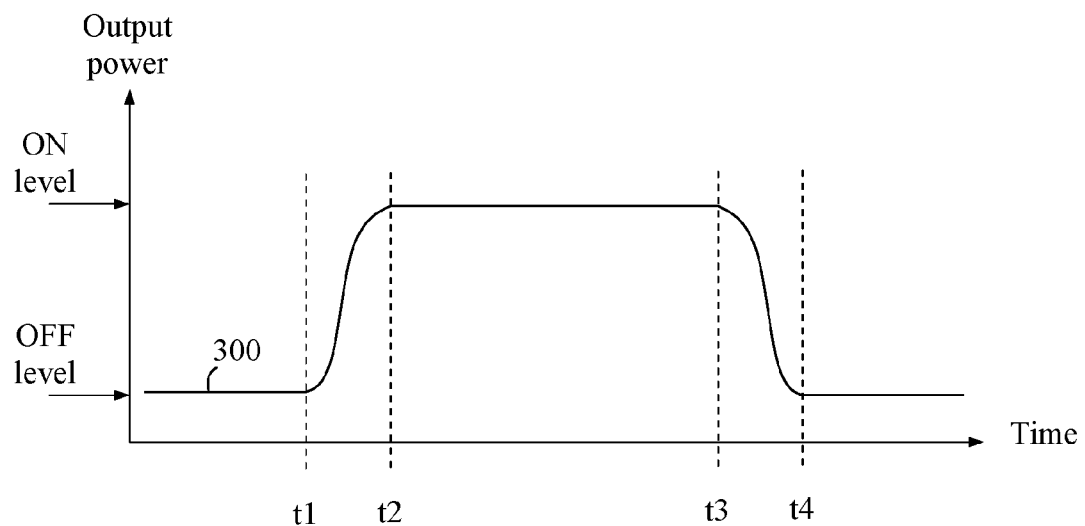
FIG. 3 is a diagram illustrating output power from a radio node when using TDD, according to the prior art.
Figure 4:
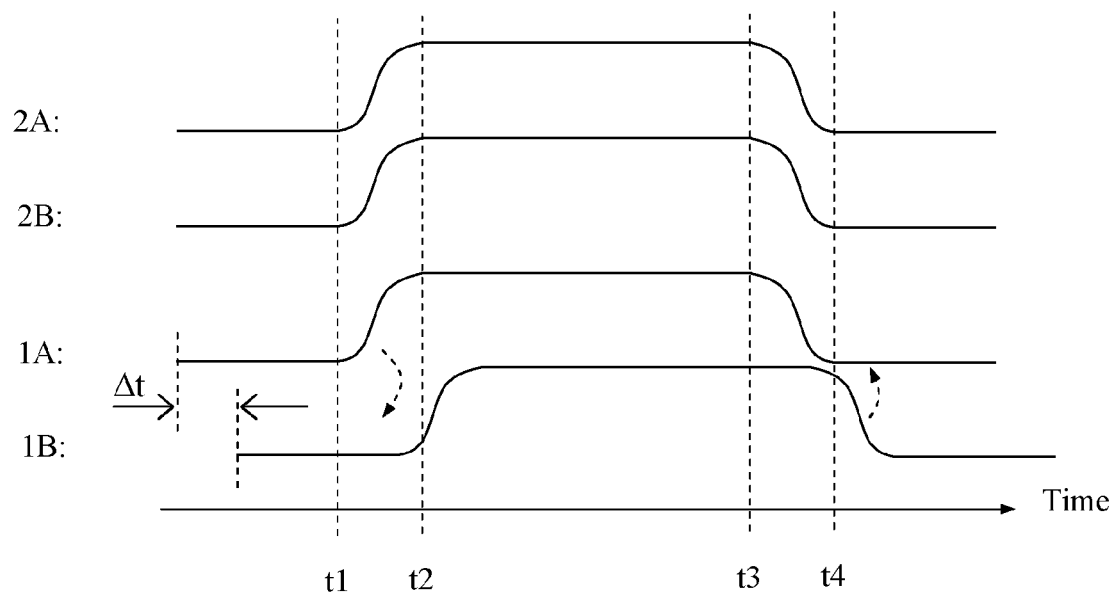
FIG. 4 is a diagram illustrating output power from multiple branches of a radio node when using TDD, according to the prior art.

Starting with the example of FIG. 5a, the radio node 500 is illustrated when switching from transmit mode to receive mode, i.e. when passing through the transition period as of t3-t4 shown in FIGS. 3 and 4. Thus, when each TX chain 504a, 506a is on, they must be turned off at a prescribed time, or "time-out", for ending the TX mode according to the radio frame scheme, as indicated in TX chains 504a and 506a as "on→off". Otherwise, a TX chain that is turned off too late, i.e. after the prescribed time, might cause interference and/or damage in the RX chains 504b, 506b when switching to the RX mode.

In this solution, the radio node 500 comprises a control unit 508 which obtains one or more "indication signals" generated by the TX chain in one or both of the branches A, B which indicate that the TX mode has been turned off in the respective chain. The indication signal may be any suitable notification that indicates TX mode off, such as a message or just one or more rudimentary pulses or the like that can be recognized by the control unit 508, and the solution is not limited in this respect.

If the radio node 500 works properly with no harmful misalignment between its branches, this indication signal should have been generated by all braches A, B preferably when the above-mentioned time-out is reached for the TX mode according to the radio frame scheme, such as when any of the above-mentioned guard periods expire which basically corresponds to the end of transition period t3-t4 in FIGS. 3 and 4. In that case, the RX chains 504b, 506b can be safely turned on without receiving any energy generated from any of the TX chains 504a and 506a.

This solution dictates that the control unit 508 determines whether the TX mode has been turned off in both branches A, B based on the obtained indication signal indicating TX mode off. This determination may be made when the time-out is reached for the TX mode. In FIG. 5a, the indication signal is denoted "S1A" issued from TX chain 504a in branch A, and "S1B" issued from TX chain 506a in branch B. If the indication signal is obtained in due time from both branches A and B, the control unit 508 may suitably instruct the branches A, B to operate in the RX mode without being subjected to interference and/or damage caused by the TX chains 504a, 506a. This may be done by sending another signal denoted "S2A" and "S2B", respectively, to the RX chains 504b, 506b effectively commanding that RX chains 504b, 506b shall be turned on, as indicated in RX chains 504b and 506b as "off→on".

On the other hand, it may happen that the control unit 508 does not obtain the indication signal from one of the branches, e.g. from branch B being "faulty", before the time-out is reached. The signal S1B may thus be received too late or not at all from TX chain 506a in branch B. In that case, the control unit 508 will, in addition to the above instruction to the branches for starting to operate in the RX mode, perform at least one of the following actions:

1) The control unit 508 may disable the TX mode in the faulty branch, e.g. branch B, as indicated by the dashed arrow to branch B, and
2) the control unit 508 may alternatively or additionally report the faulty branch B to a supervision function which in this example is implemented in an O&M node 510 as indicated by the dashed arrow to the O&M node 510.

If action 1) is performed, any further interference and/or damage caused by branch B will be stopped, and if action 2) is performed, the supervision function is able to take actions for repairing or replacing the faulty branch B. Thereby, the above-described operation of the control unit 508 will ensure that a faulty branch may be discovered with little delay and that the interference and/or damage it might cause may be limited, e.g. to a minimum. In addition to any of the above actions 1) and 2), the control unit 508 may also adjust a transmission delay of the faulty branch B in an attempt to eliminate the fault, e.g. by altering a TX delay buffer 502B located in the digital radio part 502 and coupled to branch B.

Further, the indication signal may be triggered in a respective branch A or B by any of:
A) Detecting that the TX chain 504a, 506a in the respective branch 504, 506 has no input signal from the digital radio part 502.
B) Detecting that the TX chain 504a, 506a in the respective branch 504, 506 is shut off.
C) Detecting that a transmit power amplifier, not shown, in the respective branch 504, 506 is shut off.
D) Detecting that communication signals leaving the TX chain 504a, 506a in the respective branch 504, 506 have a strength not exceeding a maximum acceptable level, so as to cause no harmful interference and/or damage.

In the example shown in FIG. 5b, the radio node 500 is illustrated when switching from receive mode to transmit mode, i.e. when passing through the transition period as of t1-t2 shown in FIGS. 3 and 4. Thus, when each RX chain 504a, 506a is on, they must be turned off at a prescribed time for ending the RX mode according to the radio frame scheme, as indicated in RX chains 504b and 506b as "on→off". Otherwise, an RX chain that is turned off too late, i.e. after the prescribed time, might be subjected to interference and/or damage by transmissions from the TX chains 504a, 506a when switching to the TX mode.

In this example, the control unit 508 obtains one or more indication signals generated by the RX chain in one or both of the branches A, B which indicate that the RX mode has been turned off in the respective chain. In correspondence with the example of FIG. 5a, the indication signal may likewise be any suitable notification that indicates RX mode turned off.

This solution dictates that the control unit 508 in FIG. 5b determines whether the RX mode has been turned off in both branches A, B based on the obtained indication signal indicating RX mode turned off. This determination may e.g. be made when the time-out is reached for the RX mode. In FIG. 5b, the indication signal is denoted "S1A" issued from RX chain 504b in branch A, and "S1B" issued from RX chain 506b in branch B. If the indication signal is obtained in due time from both branches A and B, the control unit 508 can instruct the branches A, B to start operate in the TX mode without causing interference and/or damage in the RX chains 504b, 506b. This can be done by sending another signal denoted "S2A" and "S2B", respectively, to the TX chains 504a, 506a effectively commanding that TX chains 504a, 506a shall be turned on, as indicated in TX chains 504a and 506a as "off→on".

When the control unit 508 determines that the RX mode has not been turned off in one of the branches, e.g. by not obtaining the indication signal from a faulty branch before the prescribed time-out is reached, the control unit 508 will, in addition to instructing the branches to start operate in the TX mode, perform at least one of the following actions:

1) The control unit 508 may disable the RX mode in the faulty branch, either of the dashed left arrows from control unit 508, and
2) the control unit 508 may alternatively or additionally report the faulty branch to a supervision function, i.e. the O&M node 510.

In either of the two examples of FIGS. 5a and 5b, the described procedure may be performed at intervals according to a preset scheme, to check whether the parallel branches 504, 506 in the radio node 500 are aligned or misaligned in time. Alternatively or additionally, the procedure may be performed in order to identify any faulty branch when detecting disturbances, damage or interference, either caused by the radio node 500. When discovering a faulty branch, the control unit 508 may disable the RX or TX mode in the faulty branch according to alternative 1) above simply by shutting off the corresponding RX or TX chain, respectively, in the faulty branch.

Figure 6:
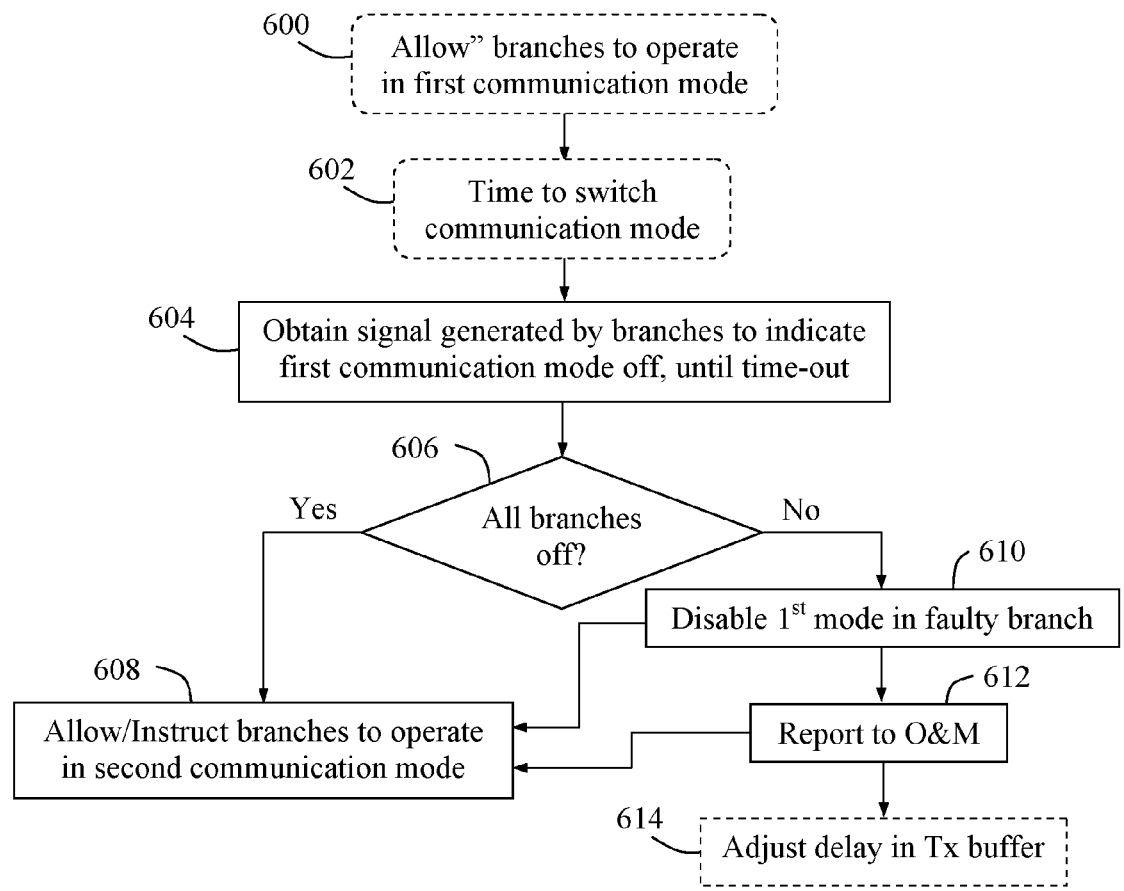
FIG. 6 is a flow chart illustrating a procedure in a radio node, according to some possible embodiments.

A procedure for controlling a change of communication mode between transmit mode and receive mode in a radio node according to a Time Division Duplex, TDD, scheme, will now be described with reference to the flow chart in FIG. 6, illustrating actions executed in the radio node, e.g. implemented in a control unit as in the examples of FIGS. 5a and 5b. The radio node has at least two parallel branches and antennas for transmission and reception of radio signals through each respective one of the at least two parallel branches. It is assumed that the branches currently operate in a first communication mode of a transmit mode and a receive mode. The procedure illustrated in FIG. 6 may be employed also in the scenarios shown in FIGS. 5a and 5b.

A first schematic action 600 illustrates that initially in this procedure, the at least two parallel branches are "allowed" to operate in a first communication mode in accordance with the prevailing radio frame scheme, as mentioned above. A next schematic action 602 indicates that it is basically decided that it is time to switch communication mode from the first mode to a second communication mode of the transmit mode and the receive mode, which may be either from TX mode to RX mode, or vice versa. In other words, it is noticed that the prescribed time-out for ending the first communication mode is reached according to the radio frame scheme. So far, this is a regular operation of the radio node.

Another action 604, effectively starting the actual procedure of this solution, illustrates that one or more indication signals are obtained, which signals are generated by one or more of the at least two parallel branches to indicate that the first communication mode has been turned off in the respective branch, such as the signals S1A and S1B shown in FIGS. 5a and 5b. It is then determined in an action 606 whether the first communication mode has been turned off in all of the at least two parallel branches based on the one or more indication signals obtained in the foregoing action 604. If all branches have turned off the first communication mode, e.g. when indication signals have been received in time from all of the branches, the at least two parallel branches can be instructed to start operate in the second communication mode, in an action 608, without risking any interference or damage due to misalignment or other fault in the radio node.

If it is determined in action 606 that not all of the branches have turned off the first communication mode, e.g. when no indication signal has been received in time from one of the branches being faulty, one option in this procedure is to disable the first communication mode in the faulty branch, as shown in action 610. Another additional or alternative option in this procedure is to report the faulty branch to a supervision centre e.g. the O&M node 510 in FIG. 5a,b, shown by an action 612. When either of actions 610 and 612 are executed, the procedure can still include action 608, as indicated by the arrows towards 608. Another action 614 illustrates the above-mentioned possibility to adjust the transmission delay by altering a transmit delay buffer coupled to the faulty branch.

Figure 7:
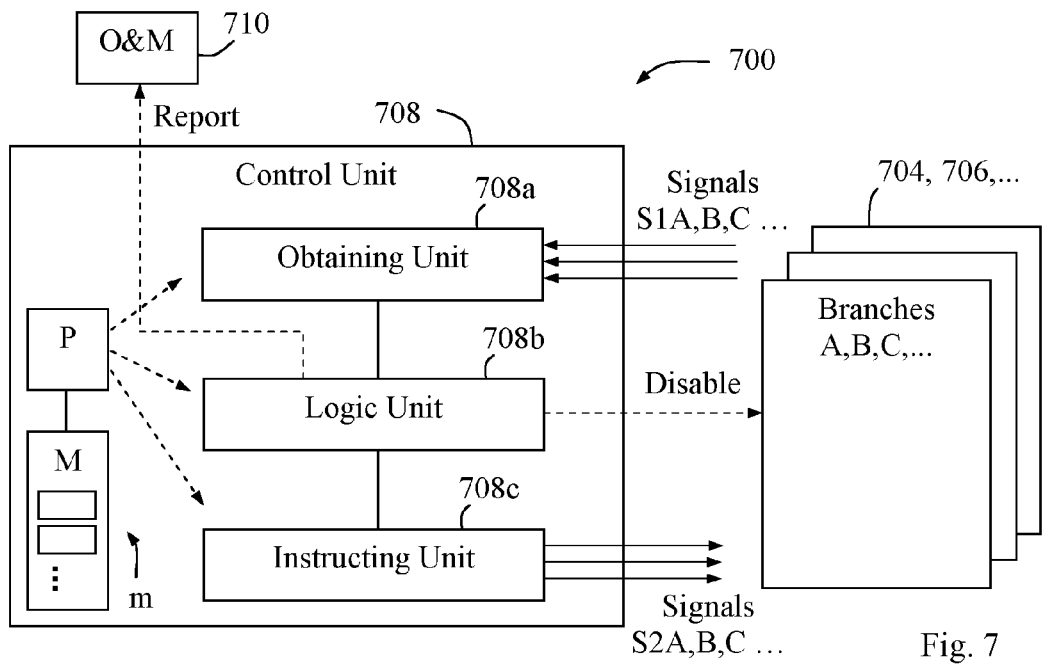
FIG. 7 is a block diagram illustrating parts in a radio node in more detail, according to further possible embodiments.

A detailed but non-limiting example of how a radio node can be configured with a control unit to accomplish the above-described solution, is illustrated by the block diagram in FIG. 7. The radio node 700 is configured to control a change of communication mode between transmit mode and receive mode according to a prevailing TDD radio frame scheme, e.g. in the manner of the procedures described above for any of FIGS. 5a, 5b and 6, respectively. As in the preceding examples, the radio node 700 may be either a base station of a cellular network, or a user equipment. In the following, each of the terms "first communication mode" and "second communication mode" refers to either of said transmit mode and receive mode. The radio node 700 will now be described in terms of a possible example of employing the solution.

The radio node 700 comprises at least two parallel branches 704, 706, . . . and antennas for transmission and reception of radio signals through each respective one of the at least two parallel branches, wherein the branches have been configured to be operable in the first and second communication modes of the transmit mode and receive mode. The radio node 700 also comprises a control unit 708 which can be used to discover whether any of the branches is faulty and does not work properly for changing between the above communication modes.

The control unit 708 comprises an obtaining unit 708a adapted to obtain one or more indication signals "S1A, B, C, . . . " generated by one or more of the at least two parallel branches 704, 706, . . . to indicate that the first communication mode has been turned off. The control unit 708 also comprises a logic unit 708b adapted to determine whether the first communication mode has been turned off in all of the at least two parallel branches 704, 706, . . . based on the obtained one or more indication signals S1A, B, C, . . . , which determination may e.g. be made when a time-out is reached for the first communication mode according to the radio frame scheme. The control unit 708 further comprises an instructing unit 708c adapted to instruct the at least two parallel branches 704, 706, . . . to operate in the second communication mode, as indicated by instruction signals "S2A, B, C, . . . ".

The radio node 700 is configured to operate such that when it is determined that the first communication mode has not been turned off in a faulty branch of the at least two parallel branches, the logic unit 708b is further adapted to perform at least one of: disable the first communication mode in the faulty branch, and report the faulty branch to a supervision centre 710.

The above radio node 700, control unit 708 and functional units 708a-c may be configured or adapted to operate according to various optional embodiments. In one possible embodiment, the logic unit 708b may be further adapted to make the above determination when the time-out is reached for the first communication mode. The control unit 708 may be further adapted to adjust a transmission delay of the faulty branch, e.g. by altering a transmit delay buffer coupled to the faulty branch.

When the first communication mode is transmit mode and the second communication mode is receive mode, the at least two parallel branches 704, 706, . . . may be configured to trigger the indication signal by any of: a transmit chain in the respective branch has no input signal, the transmit chain in the respective branch is shut off, a transmit power amplifier in the respective branch is shut off, and signals leaving the transmit chain in the respective branch have a strength not exceeding a maximum acceptable level. These options correspond to the examples A)-D) described above for FIG. 5a.

On the other hand, when the first communication mode is receive mode and the second communication mode is transmit mode instead, the at least two parallel branches 704, 706, . . . may be configured to trigger the indication signal when a receive chain in the respective branch is shut off.

In further possible embodiments, the radio node 700 may be configured to control the change of communication mode at intervals according to a scheme, to check whether the at least two parallel branches are aligned or misaligned in time. By checking the performance of the branches according to such a suitable scheme, it can be either confirmed on a regular basis that the radio node works properly or discovered that one or more of its branches is faulty which otherwise might go unnoticed for some time. Alternatively or additionally, the radio node 700 may be configured to control the change of communication mode in order to identify any faulty branch when detecting disturbances, damage or interference, either caused by the radio node.

It should be noted that FIG. 7 illustrates various functional units in the control unit 708 and the skilled person is able to implement these functional units in practice using suitable software and hardware means. Thus, this aspect of the solution is generally not limited to the shown structures of the control unit 708, and the functional units 708a-c may be configured to operate according to any of the features described in this disclosure, where appropriate.

The functional units 708a-c described above can be implemented in the control unit 708 by means of program modules of a respective computer program comprising code means which, when run by processors "P" causes the control unit 708 to perform the above-described actions. Each processor P may comprise a single Central Processing Unit (CPU), or could comprise two or more processing units. For example, each processor P may include general purpose microprocessors, instruction set processors and/or related chips sets and/or special purpose microprocessors such as Application Specific Integrated Circuits (ASICs). Each processor P may also comprise a storage for caching purposes.

Each computer program may be carried by a computer program product "M" in the control unit 708 in the form of a memory having a computer readable medium and being connected to the processor P. Each computer program product M or memory thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the control unit 708.

While the solution has been described with reference to specific exemplary embodiments, the description is generally only intended to illustrate the inventive concept and should not be taken as limiting the scope of the solution. For example, the terms "branch", "transmit chain", "receive chain", "communication mode", "indication signal" and "control unit" have been used throughout this description, although any other corresponding nodes, functions, and/or parameters could also be used having the features and characteristics described here. The solution is defined by the appended claims.

The invention claimed is:

1. A method for controlling a change of communication mode between transmit mode and receive mode in a radio node according to a Time Division Duplex, TDD, scheme, the radio node having at least two parallel branches and antennas for transmission and reception of radio signals through each respective one of the at least two parallel branches, wherein the branches currently operate in a first communication mode of said transmit mode and receive mode, the method comprising:
  obtaining one or more indication signals generated by one or more of the at least two parallel branches to indicate that said first communication mode has been turned off,
  determining whether said first communication mode has been turned off in all of the at least two parallel branches based on the obtained one or more indication signals, and
  instructing the at least two parallel branches to operate in a second communication mode,
wherein when it is determined that said first communication mode has not been turned off in a faulty branch of said at least two parallel branches, the method also comprises at least one of:
  disabling the first communication mode in the faulty branch, and
  reporting said faulty branch to a supervision centre.

2. A method according to claim 1, wherein said determination is made when a time-out is reached for the first communication mode.

3. A method according to claim 1, further comprising adjusting a transmission delay of the faulty branch.

4. A method according to claim 3, wherein adjusting the transmission delay comprises altering a transmit delay buffer coupled to the faulty branch.

5. A method according to claim 1, wherein the first communication mode is transmit mode and the second communication mode is receive mode, said indication signal being triggered in a respective branch of the at least two parallel branches by any of:
  a transmit chain in the respective branch has no input signal,
  the transmit chain in the respective branch is shut off,
  a transmit power amplifier in the respective branch is shut off, and
  signals leaving the transmit chain in the respective branch have a strength not exceeding a maximum acceptable level.

6. A method according to claim 1, wherein the first communication mode is receive mode and the second communication mode is transmit mode, said indication signal being triggered in a respective branch of the at least two parallel branches when a receive chain in the respective branch is shut off.

7. A method according to claim 1, wherein the method is performed at intervals according to a scheme, to check whether the at least two parallel branches are aligned or misaligned in time.

8. A method according to claim 1, wherein the method is performed in order to identify any faulty branch when detecting disturbances, damage or interference, either caused by the radio node.

9. A method according to claim 1, wherein the radio node is a base station of a cellular network, or a user equipment.

10. A radio node configured to control a change of communication mode between transmit mode and receive mode according to a Time Division Duplex scheme, the radio node comprising:
  at least two parallel branches and antennas for transmission and reception of radio signals through each respective one of the at least two parallel branches, wherein the branches are operable in first and second communication modes of said transmit mode and receive mode, and
  a control unit comprising:
    an obtaining unit adapted to obtain one or more indication signals generated by one or more of the at least two parallel branches to indicate that said first communication mode has been turned off,
    a logic unit adapted to determine whether said first communication mode has been turned off in all of the at least two parallel branches based on the obtained one or more indication signals, and
    an instructing unit adapted to instruct the at least two parallel branches to operate in the second communication mode,
wherein when it is determined that said first communication mode has not been turned off in a faulty branch of said at least two parallel branches, the logic unit is further adapted to perform at least one of:
  disable the first communication mode in the faulty branch, and
  report the faulty branch to a supervision centre.

11. A radio node according to claim 10, wherein the logic unit is further adapted to make said determination when a time-out is reached for the first communication mode.

12. A radio node according to claim 10, wherein the control unit is further adapted to adjust a transmission delay of the faulty branch.

13. A radio node according to claim 12, wherein the control unit is further adapted to adjust the transmission delay by altering a transmit delay buffer coupled to the faulty branch.

14. A radio node according to claim 10, wherein the first communication mode is transmit mode and the second communication mode is receive mode, and the at least two parallel branches are configured to trigger said indication signal by any of:
- a transmit chain in the respective branch has no input signal,
- the transmit chain in the respective branch is shut off,
- a transmit power amplifier in the respective branch is shut off, and
- signals leaving the transmit chain in the respective branch have a strength not exceeding a maximum acceptable level.

15. A radio node according to claim 10, wherein the first communication mode is receive mode and the second communication mode is transmit mode, and the at least two parallel branches are configured to trigger said indication signal when a receive chain in the respective branch is shut off.

16. A radio node according to claim 10, wherein the radio node is configured to control said change of communication mode at intervals according to a scheme, to check whether the at least two parallel branches are aligned or misaligned in time.

17. A radio node according to claim 10, wherein the radio node (700) is configured to control said change of communication mode in order to identify any faulty branch when detecting disturbances, damage or interference, either caused by the radio node.

18. A radio node according to claim 1, wherein the radio node is a base station of a cellular network, or a user equipment.

* * * * *